July 4, 1961
D. TAGLIERE
2,990,620
MEASURING INSTRUMENT
Filed Nov. 29, 1955
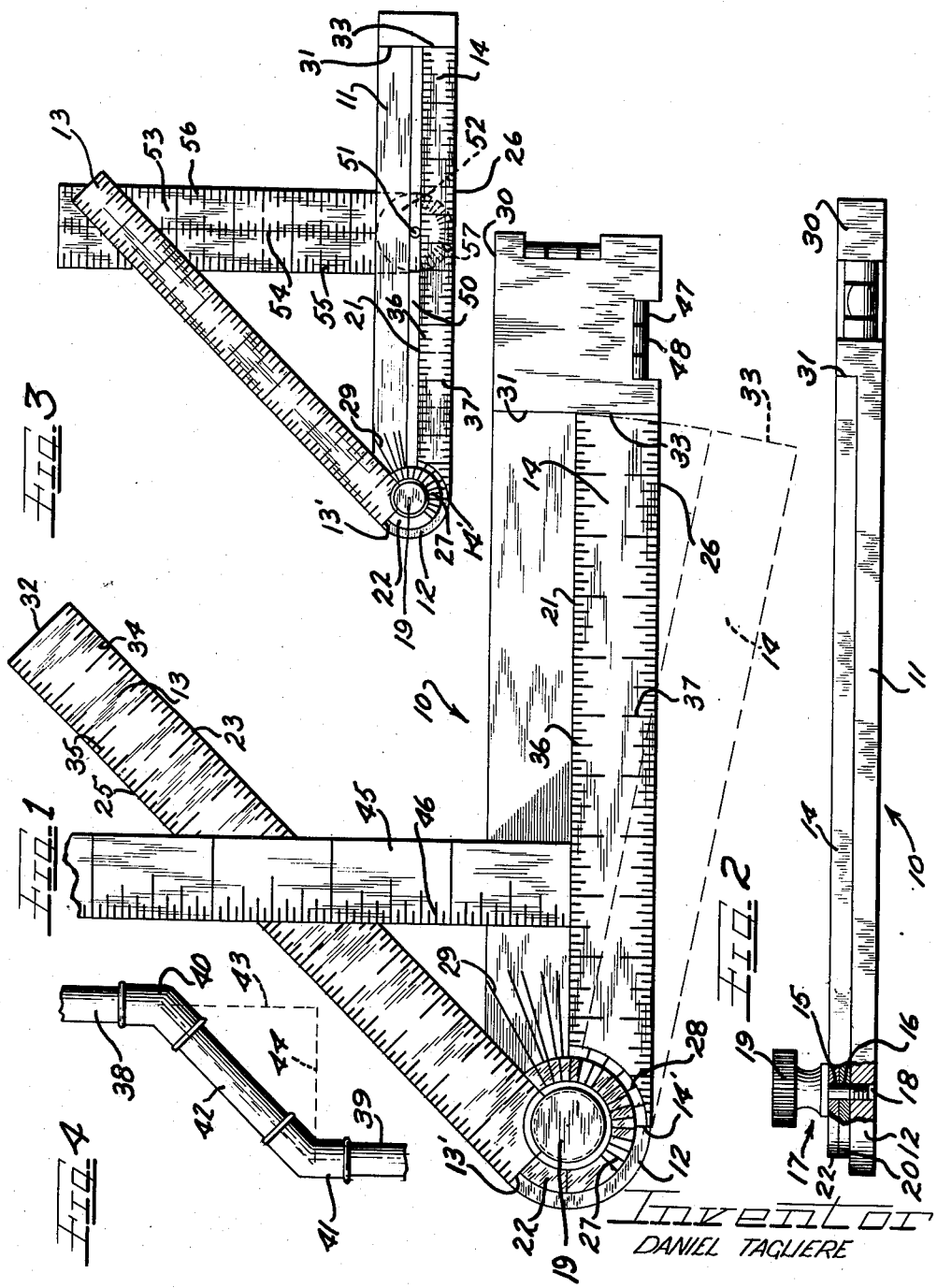
Inventor
DANIEL TAGLIERE
By Hill, Sherman, Meroni, Gross & Simpson United States Patent Office 2,990,620
Patented July 4, 1961

2,990,620
MEASURING INSTRUMENT
Daniel Tagliere, 6415 N. LeMai Ave., Chicago, Ill.
Filed Nov. 29, 1955, Ser. No. 549,649
4 Claims. (Cl. 33—98)

The present invention relates to measuring instruments, and more particularly to a multi-purpose instrument having special utililty in rapid determination of trigonometric and other plane triangular measurements.

While the present invention relates to measuring instruments of general utility, embodiments of this invention may enjoy particular utility to measure pitch or various angles, or be operative as a square, a level, a trisquare and other forms of layout instrument, and in addition be particularly operative to provide solutions to plane trigonometric problems such as the skilled craftsman and tradesman might face in the ordinary course of his work. For example, an instrument embodying the principles of this invention will provide the plumber or steamfitter or pipefitter with an easy, convenient and quick means of determining the length of pipe to be used between a pair of elbows when the pipes to be connected therewith are offset from each other so that their axes are not coincidental.

Similarly, carpenters and construction workers will find great advantage in this instrument in that the use thereof will provide a ready and convenient solution to the problems of determining the length of rafters and beams starting with only such knowledge as the length of the span and the ratio of the rise.

In the embodiments of the invention which are illustrated and described here by way of example only and not by way of imposing any limitation on this invention, the instrument includes a pair of pivotally mounted rule blades having indicia markings along the longitudinal edges thereof and having protractor or angular markings about the pivotally secured together end thereof. These blades are not only pivotally secured together but also pivotally secured to one end of a base member or base plate which also is provided with protractor or angular markings in the region of that end thereof. The three legs operate together cooperatively so that any angle may be set between the rule blades or between the rule blades and the base plate. The opposite end of the base plate carries a stop block which cooperates with the blades in such a manner that when either blade is closed over the base plate and against the block, the outer edge of the blade will be aligned with the edge of the base plate. Also, the blades themselves are so formed that they may be disposed coplanar both overlying the base plate, each overlying a lateral half of the base plate. In the stop block at the end of the base plate, there may be provided level tubes such as tubes containing a liquid with an air bubble therein to indicate a level position to facilitate proper set-up of the tool and proper alignment of the blades for the triangulation problem to be solved.

While a two blade and base plate instrument incorporating the principles of this invention may be employed for the solution of triangulation problems by utilizing the same with a supplementary rule, another embodiment of the invention may have a supplementary rule blade formed as a part thereof by pivotally connecting the supplementary rule blade to the base plate through a protractor marked end on the supplementary rule blade which is then slidable in a groove or slot in the base member. All of the details of such construction of embodiments of this invention are set forth hereinbelow in the detail description of the illustrated embodiments.

It is, therefore, an important object and feature of this invention to provide a new and improved measuring instrument.

It is another object of this invention to provide a new and improved instrument for the ready solution of trigonometric and other plane triangulation problems.

Still another object of the present invention is to provide a new and improved measuring and triangulation-solving instrument having a pair of rule blades pivotally secured together and to a base member.

Still another object of the present invention is to provide a new and improved instrument of the class described having angular or protractor indicia markings on the members thereof as well as linear indicia markings thereon.

Still another object of the present invention is to provide a new and improved instrument of the class described operable not only as a linear measuring device and as an angular measuring device but also operative as a square or level or trisquare and further being operative for the solution of triangulation or plane trigonometric problems.

Yet other objects, features and advantages of the present invention will become readily apparent from the following detailed description of the invention and embodiments thereof, from the claims, and from the accompanying drawings in which each and every detail shown is fully and completely disclosed as a part of this specification, in which like reference numerals refer to like parts, and in which:

FIGURE 1 is an elevational view of an embodiment of this invention shown together with a supplementary rule in position for the solution of a trigonometric problem;

FIGURE 2 is a bottom plan view of the instrument of FIGURE 1;

FIGURE 3 is an elevational view like FIGURE 1 but of another embodiment of the invention having a supplementary rule blade formed as a part thereof; and FIGURE 4 is a more or less diagrammatic illustration of a plumbing triangulation problem exemplifying a problem which instruments embodying this invention are readily operable to solve.

As shown on the drawings:

In the embodiment of the invention illustrated in FIGURES 1 and 2, the instrument, indicated generally at 10, has a base plate 11 to which there is pivotally secured at an end 12 thereof a pair of rule blades 13 and 14. These rule blades are apertured, as at 15 and 16, respectivly, at one end of each thereof to receive the shaft of a clamping pivot screw 17 threadably engaging an appropriately threaded aperture in the base plate, as at 18, and carrying a knurled clamping head 19 whereby loosening of the screw 17 through finger and thumb rotation of the screw head 19 will loosen the blades 13 and 14 with respect to the base plate 11 permitting the members to pivot about the axis of the screw with respect to each other and tightening of the screw 17 by reverse operation of the knurled handle or head 19 will clamp the several member together in whatever position they may be set by the user of the instrument.

To accommodate this interconnection between the three arms 11, 13 and 14 of the instrument, the base plate is formed as a flat member which is semicircular at the end 12 thereof with the threaded aperture to receive the screw 17 being at the radial center of the semicircular configuration of the end 12. The lower blade 14 is also formed as a flat strip having a width about one-half of the width of the base 11 and a thickness which is about the same as the thickness of the base 11. At the end of the rule blade 14 where it is pivotally connected to the base 11, the blade 14 is provided with a circular section 20 the center of which is aligned with the inner edge 21 of the blade and the radius of which is slightly less than the width of the blade so that the blade projects radially by a slight amount as indicated at 14' from the circular portion 20 thereof. The circular portion 20 is apertured at 16 to receive the screw shaft of the screw 17 for pivotal connection of the blade to the base 11.

The thickness of the circular portion 20 has been reduced to about one-half of the thickness of the blade 14 to accommodate reception and cooperative arrangement with a circular portion 22 on the pivoted end of the blade 13, whereby the two blades 13 and 14 are pivotally arranged to have their surfaces respectively coplanar. For this purpose, the circular end section 22 on the blade 13 is also about one-half of the thickness of the blade 13, the blades 13 and 14 being of about the same thickness. Additionally, the axis or center of the circular portion 22 is aligned with the inner edge 23 of the blade 13 and is apertured at 15 to receive the shaft at the clamping screw 17. Since the radius of the circular section 22 is about the same as the radius of the circular section 20, the two circular portions will fully overlie each other and there will be a slight projection, as at 13', of the blade 13 radially from the circular section 22. By this arrangement of the parts, the two blades 13 and 14 may be pivoted with respect to each other from a position where they are abutting each other along their inner edges 23 and 21 so that there is a zero angle between them to a position where the regions 13' and 14' abut each other so that there is a 180° angle between the blades and so that the outer edges 25 and 26, respectively, are aligned and form a continuous straight edge, the outer edges 25 and 26 being respectively parallel with the inner edges 23 and 21 on the blades 13 and 14, respectively.

Any intermediate measurable or measured position of these blades may be obtained by merely setting the same through loosening and retightening the screw 17, as described above. For setting these blades at a measurable or measured desired angle therebetween, protractor or angular indicia markings are provided thereon such that the outer circular portion 22 on the blade 13 carries angular indicia markings 27, while the blade 14 is provided with angular indicia markings or protractor markings 28 thereon radially outwardly from the circular section 22 on the blade 13 and the base plate 11 is provided with angular indicia markings 29 thereon radially outwardly from the circular sections 20 and 22. All of these indicia markings, of course, converge and center upon the center of the circular portions or semicircular portion 22, 20 and 12, respectively, of the blades 13 and 14 and the base 11.

To provide for accurate and proper alignment between the blades 13 and 14 and the edges of the base plate 11 so that while either of the blades 13 and 14 are pivotally arranged away from the base plate 11, the other thereof may be easily and accurately aligned with the base 11, the base plate is provided at the other end thereof, the end thereof away from the pivotal connection between the members, with a stop block 30 having an edge 31 extending transversely along the base 11 and disposed at such a distance from the pivot that when the blades are brought over the base 11, the ends 32 and 33 thereof will abut the face 31 and the stop block 30 so that the outer edges 25 and 26 of the blades 13 and 14 may be individually or simultaneously aligned with respective edges of the base 11. In FIGURE 1 the blade 14 is shown in such an aligned position with the base 11 and there is shown by dashed phantom lines the blade 14 moved away from that position with dashed phantom lines also showing the path of travel of the corner edges of the blade to illustrate the manner in which the stop block 30 operates to properly align the blades.

Along the inner and outer edges of the blades 13 and 14, and on the faces thereof, the blades are provided with longitudinal linear markings as at 34 and 35 on the inner and outer edges of the face of the blade 13, and as at 36 and 37 on the face along the inner and outer edges of the blade 14. While these indicia markings may be identified in inches and fractions thereof, it is preferred that the indicia markings 34 and 36 along the inner edges on the faces of the blades 13 and 14 be marked in terms of arbitrarily selected but uniformly spaced units so that they may be read as inches, feet, yards, meters or even miles, etc., as desired. Such arbitrary unit markings readily facilitate utilization of the instrument for the solution of trigonometric and other plane triangulation problems. For example, and with reference to FIGURE 4, a plumber is frequently faced with the problem of determining the length of an intermediate pipe section to be disposed between a pair of elbows on the ends of pipes which are offset from each other and are to be connected together. In FIGURE 4 the offset pipes are indicated at 38 and 39 each of which is provided with an elbow, 40 and 41 respectively, to accommodate and provide for interconnection between the elbows and thereby interconnection between the pipes by an intermediate length of pipe 42. Now, if the elbows 40 and 41 are selected as 45° elbows so that the vertical spacing, indicated at 43, is the same as the horizontal spacing, indicated at 44, between the pipes and elbows, the length of the pipe 42 may be readily determined by the instrument 10 by setting the angle between the blades 13 and 14 at 45° and utilizing a supplementary rule blade 45 having indicia markings 46 thereon. Under such conditions, as stated, the angle between the blades 13 and 14 is set at 45°. The rule blade 45 is then set with its indicia marked edge at 90° to the edge 21 of the blade 14 at a distance from the pivot axis equal in units of the indicia markings 36 to the distance 44. Thereupon, the length for the intermediate pipe section 42 may be read directly on the scale 34 on the blade 13.

In a situation where the distance 44 is not known and the angle of the elbows 40 and 41 is not known, the device of the instant invention is also operative to quickly make a determination for both the angle for the elbow and the length of the pipe 42, as well as the distance 44 and the distance 43. This may be effected by placing the instrument at the end of the pipe 39 and holding the lower edge of the blade 14 aligned with the lower edge of the base plate 11 and in a horizontal position. The horizontal position may be readily indicated by a level tube 47 set in the block 30 and having a liquid therein with an air bubble 48 to readily indicate when the base 11 is in a horizontal position. Then the blade 13 may be pivoted to a position where it is directed to the end of the pipe 38 and the supplementary rule blade 45 is then aligned with the pipe 38. Under such circumstances the angle for the elbows 40 and 41 may be read directly on the protractor indicia markings 28 and/or 29 and the length for the intermediate pipe section 42 may be read directly on the scale 34.

As stated hereinabove, it is preferred that the scales 34 and 36 be marked in arbitrary regular units so that when the instrument is used to determine such measurements as the length of rafters, etc., the reading may be taken in feet or in inches or whatever is the appropriate reading.

As stated above, each of blades 13 and 14 is pivotally secured to the base plate 11. By making both blades pivotal, certain advantages are obtained. The following advantages are presented in random order. When level 47 is directed upwardly and is used to position the base plate horizontally, blade 13 may be used therewith for sightings below a horizontal line, while blade 14 may be used therewith for sightings above a horizontal line. An analogous situation exists with respect to a vertical line where the other level is used. As a corollary, it is also possible to measure simultaneously two angles lying on opposite sides of the reference or base line, whether the base line be vertical, horizontal, or be one against which the base plate is bearingly positioned.

Further, both blades may be used to advantage when an angle is to be measured, neither of the legs of which coincide with the base plate, a horizontal line, or a vertical line.

In FIGURE 3 another embodiment of the invention is illustrated wherein the supplementary rule blade forms a part of the instrument. Otherwise the instrument is identical to that illustraed in FIGURES 1 and 2. In this embodiment of the invention, however, the base plate 11 is provided with a slot 50 extending longitudinally therein to accommodate a clamp 51 disposed axially in a semicircular end portion 52 of an auxiliary blade 53. By this arrangement, the auxiliary blade 53 may be rotated to any desired angle between it and the base 11 and/or the blade 14 as is indicated by appropriate protractor markings 57 on the reverse side of the semicircular end 52 of the blade. Longitudinally along the blade 53 there are provided regularly-spaced longitudinal indicia markings 54 as well as supplementary indicia markings 55 and 56 along the edges thereof whereby the blade may be used in the same manner as the supplementary blade 45 but is provided with still greater versatility for its cooperation with the blades 13 and 14 in that it may be set at predetermined angles with respect thereto.

In view of the foregoing, it will be readily seen that numerous variations and modifications may be effected in instruments of this type without departing from the spirit and scope of the novel concepts and principles of this invention. I, therefore, intend to cover all such modifications and variations as fall within the true spirit and scope of the novel concepts and principles of this invention.

I claim as my invention:

1. An instrument operative for the solution of plane trigonometric functions encountered in building construction comprising in combination, a base plate, a pair of rule blades pivotally secured together at one end of each thereof and to said base plate at one end thereof, said rule blades being mounted to close upon each other in edgewise engagement and flush with said plate, the mating edges of the blades having regular indicia markings thereon, angular indicia markings on one of the blades and on said one end of said plate, said markings being centered on the pivotal connection therebetween, the opposite end of said base plate having a fixed stop block thereon to align either of said blades with said base plate for use, and engageable with the ends of the blades opposite said pivotal connection, the blade edges having said markings being free of said stop block and said plate and a third rule blade slidably and pivotally connected to said base plate with angular indicia markings thereon and longitudinally spaced indicia markings thereon arranged to cooperate with the edge markings on one of said pair of blades.

2. An instrument operative for the solution of plane trigonometric functions encountered in building construction, comprising in combination: a unitary elongated base plate; a pair of rule blades pivotally secured together at one end of each thereof and to said base plate at one end thereof about a common center, said rule blades being mounted to close against each other in edgewise engagement and laterally flush with and both disposed entirely on one side of said plate, the engaging edges of said blades always being aligned with said center, each blade having a pair of longitudinal edges coextensive with each other and having uniformly spaced indicia along each of said edges; and a fixed stop block disposed at the other end of said base plate and having a common plane surface extending transversely of said base plate and disposed for flatwise engagement with the ends of said blades opposite said pivotal connection to align either of said blades with said base, the blade edges having said markings being non-engageable edgewise with either of said stop block and said base plate.

3. An instrument operative for the solution of plane trigonometric functions encountered in building construction, comprising in combination: a unitary elongated base plate; a pair of rule blades pivotally secured together at one end of each thereof and to said base plate at one end thereof about a common center, said rule blades being mounted to close against each other in edgewise engagement and laterally flush with and both disposed entirely on one side of said plate, the engaging edges of said blades always being aligned with said center, each blade having a pair of longitudinal edges coextensive with each other and having uniformly spaced indicia along each of said edges; one of said blades and also said one end of said plate having angularly arranged indicia centered on the pivotal connection therebetween and alignable with each other, the plate indicia being overlaid by said one blade; and a fixed stop block disposed at the other end of said base plate and having a common plane surface extending transversely of said base plate and disposed for flatwise engagement with the ends of said blades opposite said pivotal connection to align either of said blades with said base, the blade edges having said markings being nonengageable edgewise with either of said stop block and said base plate.

4. An instrument operative for the solution of plane trigonometric functions encountered in building construction, comprising in combination: a unitary elongated base plate; a pair of rule blades pivotally secured together at one end of each thereof and to said base plate at one end thereof about a common center, said one rule blades being mounted to close against each other in edgewise engagement and laterally flush with and both disposed entirely on one side of said plate, the engaging edges of said blades always being aligned with said center, each blade having a pair of longitudinal edges coextensive with each other and having uniformly spaced indicia along each of said edges; a fixed stop block disposed at the other end of said base plate and having a common plane surface extending transversely of said base plate and disposed for flatwise engagement with the ends of said blades opposite said pivotal connection to align either of said blades with said base, the blade edges having said markings being nonengageable edgewise with either of said stop block and said base plate; and a pair of level indicators supported by said stop block in such a position that true vertical and true horizontal may be indicated selectively for either of said rule blades when in engagement with said stop block without such rule blade necessarily engaging the reference surface, while the other of said blades is angularly disposed.

References Cited in the file of this patent

UNITED STATES PATENTS

| | | |
|---|---|---|
| 368,434 | Teller | Aug. 16, 1887 |
| 802,083 | Parnell | Oct. 17, 1905 |
| 875,462 | Rowan | Dec. 31, 1907 |
| 886,639 | Renner | May 5, 1908 |
| 925,807 | Green | June 22, 1909 |
| 927,523 | Giannousis | July 13, 1909 |
| 1,014,402 | Larsen | Jan. 9, 1912 |
| 1,135,743 | Walker | Apr. 13, 1915 |
| 1,222,959 | Longley | Apr. 17, 1917 |
| 1,313,432 | Walker | Aug. 19, 1919 |
| 1,665,527 | Brinkman | Apr. 10, 1928 |

FOREIGN PATENTS

| | | |
|---|---|---|
| 2,854 | Great Britain | 1906 |